United States Patent

Kuske et al.

Patent Number: 5,164,005
Date of Patent: Nov. 17, 1992

[54] BLACK MANGANESE/IRON OXIDE PIGMENT A PROCESS FOR ITS PRODUCTION AND ITS USE

[75] Inventors: Peter Kuske; Gunter Buxbaum, both of Krefeld, Fed. Rep. of Germany

[73] Assignee: Bayer Aktiengesellschaft, Leverkusen, Fed. Rep. of Germany

[21] Appl. No.: 853,886

[22] Filed: Mar. 18, 1992

Related U.S. Application Data

[63] Continuation of Ser. No. 644,320, Jan. 22, 1991.

[30] Foreign Application Priority Data

Feb. 3, 1990 [DE] Fed. Rep. of Germany ....... 4003255

[51] Int. Cl.$^5$ ............................................... C09C 1/22
[52] U.S. Cl. .................................... 106/459; 106/455
[58] Field of Search ............................... 106/459, 455

[56] References Cited

U.S. PATENT DOCUMENTS 4,680,130 7/1987 Hibst ............................... 252/62.60

Primary Examiner—William R. Dixon, Jr.
Assistant Examiner—Margaret V. Einsmann
Attorney, Agent, or Firm—Connolly & Hutz

[57] ABSTRACT

A black manganese/iron oxide pigment having a spinel structure and having the composition $Mn_xFe_{3-x}O_4$ wherein x has a value from 0.1 to 0.9, is prepared by the steps:

a) oxidizing iron(II) salts or mixtures of iron(II) salts and manganese(II) salts, in solution or after reaction with alkaline precipitants, with manganese dioxide or other compounds containing manganese in high valency, b) additionally oxidizing the salts of (a) to establish an Fe(III) content therein with another oxidizing agent, and c) filtering, washing, drying and grinding the pigment;

and the pigment is useful for pigmenting building materials to a black color.

2 Claims, No Drawings

BLACK MANGANESE/IRON OXIDE PIGMENT A PROCESS FOR ITS PRODUCTION AND ITS USE

This application is a continuation of application Ser. No. 07/644,320 filed Jan. 22, 1991.

This invention relates to a black pigment consisting essentially of spinel mixed crystals of the magnetite/manganese ferrite mixture series, to a process for the production of this pigment and to its use.

BACKGROUND OF THE INVENTION

Black pigments based on magnetite have been successfully used in many applications and can be obtained by various methods (Ullmanns Encyklopädie der technischen Chemie 4, New Revised and Extendd Edition, Vol. 18, Inorganic Pigments, 1979, p. 603). Readily dispersible, blue-tinged black pigments of high coloring power can be produced by the precipitation method. Black pigments with a bluish tinge are particularly advantageous for use in building materials by virtue of their deep black color impression. A major disadvantage of the single-step and two-step precipitation method for the production of such pigments lies in the fact that neutral salt is formed in a quantity of equivalent to the alkalis used.

Accordingly, the problem addressed by the present invention was to provide a pigment having the positive properties of precipitated magnetite, but without any of the described disadvantages.

BRIEF DESCRIPTION OF THE INVENTION

These requirements are satisfied by a black manganese/iron oxide pigment which is characterized in that it is present in spinel structure and has the general composition $Mn_xFe_{3-x}O_4$ with values for x of 0.1 to 0.9.

DETAILED DESCRIPTION

A black manganese/iron oxide pigment having a spinel structure and having the composition $Mn_xFe_{3-x}O_4$ wherein x has a value from 0.1 to 0.9, is prepared by the steps:

a) oxidizing iron(II) salts or mixtures of iron(II) salts and manganese(II) salts, in solution or after reaction with alkaline precipitants, with manganese dioxide or other compounds containing manganese in high valency, b) additionally oxidizing the salts of (a) to establish an Fe(II) content therein with another oxidizing agent, and b) filtering, washing, drying and grinding the pigment;

and the pigment is useful for pigmenting building materials to a black color.

The present invention relates to this pigment.

This is in contrast to the teaching of DE-C 1 767 868, according to which the spinel structure in Mn-containing mixed oxides is said to be harmful to color and coloring strength. In a particularly preferred embodiment of the pigments according to the invention, the values for x are from 0.3 to 0.8.

The pigments according to the invention may be obtained by oxidation of iron(II) salts in aqueous solution or suspension with manganese dioxide and/or other oxides containing manganese in relatively high valency (+3 to +7).

Accordingly, the present invention also relates to a process for the production of the pigments according to the invention in which a) iron(II) salts or mixtures of iron(II) salts and manganese (II) salts are oxidized—either in solution or after reaction with alkaline precipitants—with manganese dioxide and/or other compounds containing manganese in relatively high valency, b) to establish an Fe(III) content in the pigment, oxidation is additionally carried out with other oxidizing agents, preferably with oxygen-containing gases, c) the pigment is filtered, washed, dried and ground.

In the prior art, calcination processes (cf. DE 1 767 868 B 2, DE 2 620 953) or precipitation processes (U.S. Pat. No. 3,822,210, DE 3 435 698 A 1) are used for the production of manganese/iron oxides. The disadvantage of calcination processes lies in the often considerable sintering of the oxides during calcination. Where these processes are used, pigments of high coloring power can only be obtained after expensive grinding. The disadvantage of precipitation processes lies in the formation of neutral salt in a quantity equivalent to the alkalis used:

Neutralization process:

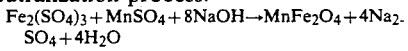

Oxidation process:

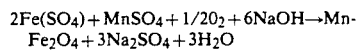

In the process according to the invention, the oxidizing agent acts partly or completely as a manganese source for formation of the pigment. It has surprisingly been found that phases of spinel structure can be directly obtained in this process without any need for subsequent calcination.

By virtue in particular of the smaller quantities of sodium hydroxide required and neutral salt formed by comparison with the precipitation process, the process according to the invention is particularly advantageous both in economic and in ecological terms:

Oxidation with manganese dioxide ($MnO_2$):

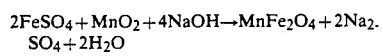

Oxidation with hausmannite ($Mn_3O_4$):

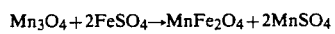

Oxidation with permanganate ($KMnO_4$):

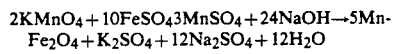

The process according to the invention is described in more detail in the following with reference to the reaction with manganese dioxide.

The reaction with manganese dioxide is particularly advantageous because manganese dioxide is sufficiently available as inexpensive raw material or even as a waste product. In the context of the invention, manganese dioxide is understood to be any manganese oxide having a degree of oxidation x corresponding to a composition $MnO_x$ with values for x of $1.7 < x < 2.1$. These manganese dioxides may contain relatively large quantities of water of crystallization and foreign cations. They crystallize in various lattice types (cf. for example E. Preisler, Chemie in unserer Zeit, 1485), 137-148 (1980).

The process according to the invention is preferably carried out by oxidation of iron(II) salts in aqueous solution—after reaction with alkaline precipitants—by addition of manganese dioxide, filtration of the pigment formed, washing, drying and grinding. The reaction temperatures may be between room temperature and the boiling temperature. Oxidations at higher temperatures and pressures under hydrothermal conditions are also possible.

In the reactions, pigments with a bluish tinge are increasingly obtained with increasing temperature. Accordingly, the oxidation is preferably carried out between 80° C. and the boiling point. It has also been found that the quality of the manganese dioxides has a major bearing on the properties of the pigment. Black pigments with a bluish tinge are preferentially obtained where the oxidation process is carried out with less reactive manganese dioxides.

The reactivity of the manganese dioxides is characterized by determination of the specific surface according to BET ($S_{BET}$) by the nitrogen method according to DIN 66 131. In addition, the conversions were determined by titration of the iron(II) content of an iron(II) sulfate solution during the reaction with manganese dioxide at a pH value of 2. To this end, 0.5 mol FeSO$_4$ solution (200 g/l) was added to 0.1 mol of the manganese dioxide to be investigated and the pH value was kept constant at pH 2. The iron(II) contents were determined at intervals of 5 minutes after filtration of the suspension in the filtrate. The reduction in the iron(II) content over a period of 15 minutes was used as the criterion for the reactivity of the manganese dioxide.

The use of manganese dioxide for the oxidation reaction makes the process according to the invention particularly economical because the dissipation of heat, particularly where oxidation is carried out near the boiling point, is drastically reduced by virtue of the reduced amount of air required compared with the conventional oxidation process.

The pigments obtained by the process according to the invention are deep black and readily dispersible. They have particle diameters of 0.1 to 1 μm and specific surfaces ($S_{BET}$) of 3 to 15 m$^2$/g. Suitable iron salts for the production of the pigments are the sulfates and nitrates and, to a limited extent, also the chlorides. By virtue of their minimal corrosiveness, it is particularly preferred to use the sulfates, such as the green salt obtained in the production of titanium dioxide or even pickling salts. The manganese dioxide may be used both in the form of naturally occurring manganese dioxide ore and in the form of technical manganese dioxide (synthetic manganese dioxide, electrolytic manganese dioxide). Waste products containing manganese dioxide from chemical processes (for example Sacharin synthesis, zinc refining) are also particularly suitable. The less reactive manganese dioxides are particularly suitable for the production of black pigments with a bluish tinge.

In another preferred embodiment of the process according to the invention, manganese dioxide ore or waste manganese dioxides from chemical processes are preferably used as the manganese dioxide while the iron salts used are preferably iron salts from the production of TiO$_2$ or from pickling plants.

After grinding in any of the mills typically used in the manufacture of pigments, for example in pin mills, vibrating ball mills or jet mills, tests are carried out in the binder Alkydal ® F 48 (a product of Bayer AG) in accordance with DIN 6174/ISO 7724, 1-3 Drafts for determining coloring strenght and color tinge and the CIELAB (C/2°) values are shown in the Examples. The magnetite pigment Bayferrox ® 330 (a product of Bayer AG) is used for comparison.

The pigments were further characterized by determination of the specific surface according to BET ($S_{BET}$) by the nitrogen method according to DIN 66 131.

The present invention also relates to the use of the black pigment according to the invention for pigmenting building materials.

The following Examples are intended to illustrate the invention without limiting it in any way.

The following manganese dioxides were used for the tests:

| Manganese dioxide No. | MnO$_2$ content % | Reactivity mol FeSO$_4$ min$^{-1}$ l$^{-1}$ | BET m$^2$/g |
|---|---|---|---|
| 1 Manganese dioxide ore | 85.5 | 0.86 | 21 |
| 2 Synthetic manganese dioxide | 81 | 0.62 | 5 |
| 3 Waste manganese dioxide | 16* | 0.93 | 25** |

*Moist filter cake
**Dried at 100° C.

EXAMPLE 1

6.27 l FeSO$_4$ solution (200 g/l) were introduced into a stirred reactor equipped with an aerating stirrer and, after the addition of 6 l distilled water, 1,000 ml sodium hydroxide (650 g/l) were introduced with stirring. After heating to 95° C., the precipitate consisting essentially of Fe(OH)$_2$ was oxidized by addition of 224 g of manganese dioxide No. 2 over a period of 6 hours. To avoid oxidation with air, the reaction mixture was purged with nitrogen. After the reaction, the black suspension was filtered off under suction and the pigment was washed and dried in a recirculating air drying cabinet. According to analysis, the product contains approximately 2% unreacted manganese dioxide and a ferrite phase having the composition Mn$_{0.55}$Fe$_{2.45}$O$_4$. The specific surface is 8.4 m$^2$/g.

The dried pigment of Example 1 was ground for 1 minute with agate balls in a vibrating ball mill of the Dismembrator R type. Coloring strength was then determined as described above in Alkydal F 48 paint against Bayferrox 330 ®=100% (see Table 1). The bluish tinge b* is acceptable for b* values of ≦0.

EXAMPLE 2

6 l distilled water were introduced into a 30 liter stirred tank and 448 g of manganese dioxide No. 2, 1 l NaOH (650 g/l) and 6.27 l FeSO$_4$ (200 g/l) were continuously added with stirring at 95° C. After a reaction time of 8 hours, the pigment was worked up in the same way as in Example 1. According to analysis, the product contains approximately 5% manganese dioxide in unreacted form and a ferrite phase having the composition Mn$_{0.8}$Fe$_{2.2}$O$_4$. The specific surface was 9.3 m$^2$/g. The color data are shown in Table 1.

EXAMPLE 3

The procedure was as in Example 2, except that 212 g of manganese dioxide No. 1 were used. The manganese dioxide was added in 10 portions of 21 g over a period of 5 hours, followed by aeration for 2 hours with 200 l air/h. According to analysis, the product consists of a ferrite phase having the composition $Mn_{0.6}Fe_{2.4}O_4$. The specific surface is 7.1 m$^2$/g. The color data are shown in Table 1.

TABLE 1

Color data of Examples of 1 to 3

| Example | CS % | Δa* | Δb* | Δc* |
|---|---|---|---|---|
| 1 | 133 | −0.1 | 0 | 0 |
| 2 | 85 | −0.2 | −0.4 | 0.4 |
| 3 | 130 | −0.1 | −0.5 | 0.5 |
| Bayferrox ® 330 | 100 | 0 | 0 | 0 |

What is claimed is:

1. Black pigment consisting of a mixed oxide of manganese and iron of the general composition $Mn_xFe_{3-x}O_4$ and having a spinel structure wherein the value of x is 0.1 to 0.9.

2. Black pigment as claimed in claim 1, having a specific surface area of 3 to 15 m$^2$/g.